United States Patent Office 3,845,080
Patented Oct. 29, 1974

3,845,080
BLUE ANTHRAQUINOID ACID DYES
Fritz Graser, Ludwigshafen, Germany, assignor to Badische Anilin- & Soda-Fabrik Aktiengesellschaft, Ludwigshafen (Rhine), Germany
No Drawing. Filed May 7, 1973, Ser. No. 357,726
Claims priority, application Great Britain, May 15, 1972, 22,615/72
Int. Cl. C09b 1/34
U.S. Cl. 260—372        6 Claims

ABSTRACT OF THE DISCLOSURE

New anthraquinoid acid dyes of the formula (I):

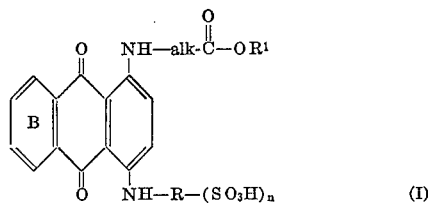

in which alk is a divalent alkylene radical, $R^1$ is hydrogen, substituted or unsubstituted alkyl or cycloalkyl of 1 to 15 carbon atoms, R is a divalent mononuclear or binuclear condensed or non-condensed aromatic radical which may be substituted, n is one of the integers 1 and 2 and in which one or two of the hydrogens in ring B may be replaced by halogen or hydroxy.

The dyes dye nitrogenous fibers, particularly polyamide fibers, clear blue shades of good fastness properties.

---

The invention relates to new blue anthraquinoid acid dyes of the 1,4-diaminoanthraquinone series.

The new acid dyes have the formula (I):

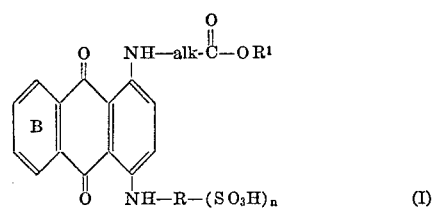        (I)

in which alk is a linear or branched alkylene of one to three carbon atoms, $R^1$ is hydrogen or alkyl or cycloalkyl of one to fifteen carbon atoms which may bear alkoxy, alkylthio of one to eight carbon atoms, chlorine or bromine as a substituent, R is a divalent mononuclear or binuclear condensed or non-condensed aromatic radical in which one to four of the hydrogens may be replaced by alkyl, alkoxy, alkylthio of one to four carbon atoms and/or halogen, and n is one of the integers 1 and 2, and in which one or two of the hydrogens in ring B may be replaced by halogen or hydroxy.

The new dyes are valuable blue acid dyes which dye nitrogenous fibers, particularly polyamide fibers, clear blue shades of good fastness properties, such as fastnes to light and wet treatment.

Dyes which are of particular tinctorial and therefore industrial interest are those of the formula (Ia):

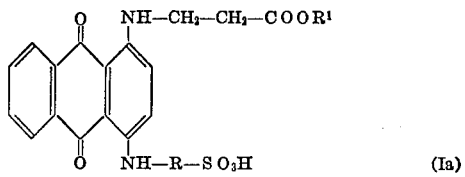        (Ia)

in which R and $R^1$ have the meanings given above. Those dyes of the formula (Ia) are particularly preferred in which R is an unsubstituted or substituted divalent phenylene or diphenyl ether radical.

Alkylene bridges of one to three carbon atoms are suitable as linear or branched alkylene for alk. The following alkylene bridges are given as specific examples: methylene, 1,2-ethylene, 1,2-propylene and 1,3-propylene. Among the said radicals, that of 1,2-ethylene $$(-CH_2-CH_2-)$$

is particular preferred.

$R^1$ may be, apart from a cycloaliphatic radical, particularly hydrogen or alkyl or one to fifteen carbon atoms. Hydrogen and alkyl of one to four carbon atoms are particularly preferred for $R^1$. One or two hydrogens in the alkyl may be replaced by alkoxy or by alkylthio of one to eight carbon atoms.

Specific examples of alkyl for $R^1$ are methyl, ethyl, propyl, butyl, pentyl, hexyl, cyclopentyl, cyclohexyl, cyclooctyl, γ-methoxypropyl, γ-ethoxypropyl, γ - (2 - ethylhexoxy) - propyl, nonyl, decyl, β - ethylmercaptoethyl, 4-nonylcyclohexyl, 4-dodecylhexyl, norbornyl, norbornylmethyl, dicyclopentadienyl or 2-ethylhexyl.

Hydrogen, methyl, ethyl, propyl, isopropyl, butyl, isobutyl, γ-methoxypropyl, γ-ethoxypropyl, β-methoxyethyl and β-ethoxyethyl are especially suitable for $R^1$.

Particularly suitable divalent mononuclear or binuclear aromatic radicals whose nuclei may be condensed or non-condensed which are represented by R are phenylene and radicals of the formula:

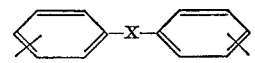

in which X is a direct linkage or $-O-$, $-S-$, $-SO_2$, $-CH_2-$, $-CH_2-CH_2-$, $-\overset{|}{C}H-CH_3$ or $CH_3-\overset{|}{\underset{|}{C}}-CH_3$.

One to four, preferably one to three, hydrogens in the aromatic group may be replaced by alkyl, alkoxy, alkylthio of one to four carbon atoms and/or halogen such as chlorine, bromine or fluorine and the substituents may be identical or different.

The divalent radical R may be derived for example from benzene, toluene, xylene, trimethylbenzene, naphthalene, chlorobenzene, anisol, phenetol, diphenyl, diphenyl ether, 4-chlorodiphenyl ether, diphenyl thioether, diphenylmethane or diphenylethane.

The phenylene radical is preferred for R and one to three hydrogens therein may be replaced by methoxy, methyl, methylthio, fluorine, chlorine and/or bromine; the diphenyl ether radical, which may bear chlorine or bromine as substituent, is also preferred.

One or two hydrogens in the ring B of the anthraquinone system may be replaced by hydroxy or halogen. Those dyes are preferred however in which the ring B bears no substituents.

The new acid dyes are advantageously obtained by sulfonation of compounds of the formula (II):

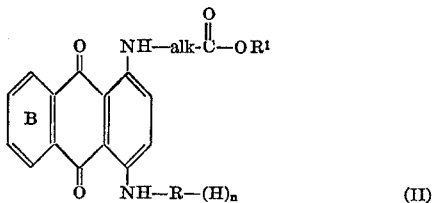
(II)

in which alk, R, R¹, n and B have the meanings given above. The compounds of the formula (II) are hereinafter referred to as dye bases.

Sulfonation is carried out by a conventional method with concentrated sulfuric acid, 100% sulfuric acid or oleum depending on the sulfonating agent at low temperature, for example at 0° to 5° C. or at room temperature to moderately elevated temperatures. The term "moderately elevated temperature," as used herein, is intended to mean temperatures of up to about 70° C. When R¹ is alkyl the sulfonation is preferably carried out at low temperature in order that saponification of the ester grouping is substantially prevented. By appropriate choice of the sulfonation conditions dyes or mixtures of dyes of the formula (I) may be obtained in which R¹ is wholly or partly hydrogen and the remaining radicals R¹ are alkyl. In cases in which R is phenylene, only one sulfonic acid group is generally introduced in the sulfonation. When R is a naphthylene radical or a radical of the formula

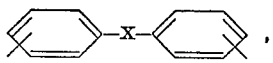

however, two sulfonic acid groups are easily introduced.

The dye bases of formula (II), particularly the dye bases in which alk is an ethylene bridge, may be obtained by adding on an unsaturated compound of the formula (III):

(III)

in which one R³ is methyl, the other R³ is hydrogen or preferably both radicals R³ are hydrogen and R¹ has the meanings given above, to a diaminoanthraquinone of the formula (IV):

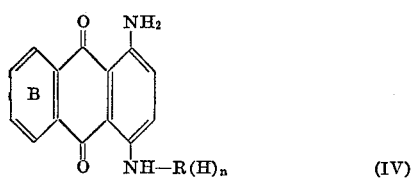
(IV)

in which B, R and n have the meanings given above. The reaction of compound (IV) with compound (III) may be effected for example by heating the component (IV) in an excess of the component (III); the latter may serve at the same time as a diluent. When R¹ is hydrogen, the reaction may also be carried out in the presence of from 5 to 25% by weight of water, based on compound (III).

Reaction of (III) with (IV) may also be carried out in an inert organic solvent or diluent such as dichlorobenzene, chlorobenzene, nitrobenzene, xylene or toluene in the presence of a more or less large amount of catalyst by heating at temperatures of from 50° to 200° C., preferably from 100° to 180° C. Particularly suitable catalysts are agents having an acid reaction such as o-toluenesulfonic acid, p-toluenesulfonic acid or benzenesulfonic acid.

Reaction of compound (III) with compound (IV) may also be carried out in moderately concentrated mineral acids such as from 50 to 75% by weight sulfuric acid in a conventional manner.

Examples of suitable compounds of the formula (III) are methacrylic acid, crotonic acid, methyl methacrylate, methyl crotonate, particularly isobutyl acrylate, acrylic acid, ethyl acrylate, propyl acrylate and methyl acrylate, of which acrylic acid, methyl acrylate and ethyl acrylate are particularly preferred.

Dye bases of the formula (II) may also be prepared from a compound of the formula (V):

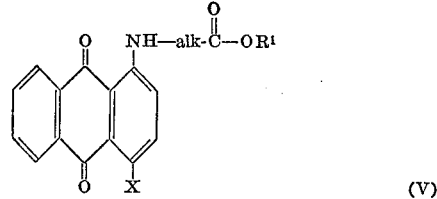
(V)

in which X is a group which can be replaced by

such as halogen.

Examples of suitable compounds (VII) are aromatic amines in which one to four hydrogens may be replaced by alkyl, alkoxy, alkylthio of one to four carbon atoms and/or halogen. Specific examples are: aniline, mesidine, xylidine, chloroaniline, toluidine, anisidine, phenetidine, aminodiphenyl, aminodiphenyl ether, naphthylamine and aminodiphenylmethane.

Compounds of the formula (II) in which R¹ is a substituted or unsubstituted alkyl or cycloalkyl may also be prepared from a compound of the formula (II) in which R¹ is hydrogen by esterification in a conventional manner.

Compounds of the formula (I) may also be obtained by reaction of a compound of the formula (IX):

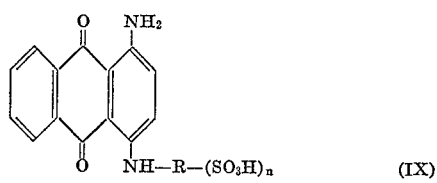
(IX)

with a compound of the formula (III) under the same conditions as for the reaction of (IV) with (III).

The dyes of the formula (I) are valuable blue acid dyes which dye nitrogenous fibers, particularly polyamide, in clear blue shades of very good light fastness, fastness to wet treatment and with good tinctorial behaviour such as good levelling power. The dyes (I) may be used both in the form of sulfonic acids and in the form of water-soluble salts such as sodium, potassium or ammonium salts.

The dyes may also be used mixed with one another or mixed with other dyes. The dyes may be used in the form of the free acids or in the form of their water-soluble salts.

The following Examples illustrate the invention. The parts and percentages specified are by weight.

EXAMPLE 1

30 parts of 1-amino - 4 - (4' - methylphenylamino)-anthraquinone, 112 parts of acrylic acid and 38 parts of water are heated to boiling while stirring and boiled until reaction is completed. This requires about four hours. While still hot, the whole is diluted with 200 parts of water, allowed to cool and filtered and the filter residue is washed with water to remove excess acrylic acid and dried. The compound of the formula:

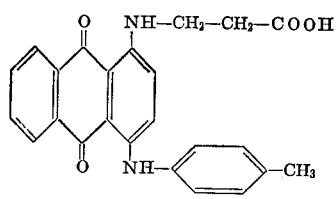

is obtained in a very good yield.

The mixture dyes polyamide blue shades of very good light and wet fastness properties.

EXAMPLE 15

The procedure corresponds to the description in Example 5 but the starting compound used is 1-amino-4-(4'-(4''-chlorophenoxy)-anilino)-anthraquinone (see Example 1). A compound of the formula:

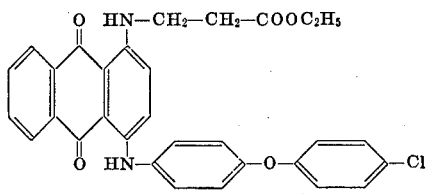

is obtained which is sulfonated at 0° to 5° C. with oleum ($SO_3$-content: 5%). A dye mixture is obtained which consists of about 50 parts of the dye described in Example 13 and about 50 parts of the dye of the formula:

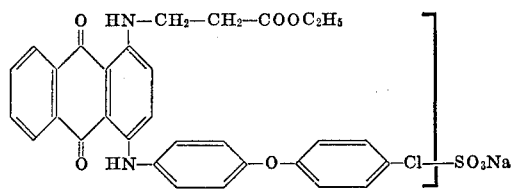

The mixture dyes polyamide blue shades of very good light and wet fastness properties.

EXAMPLE 16

The procedure described in Example 5 is followed but 31.4 parts of 1-amino-anilinoanthraquinone is used instead of 32.8 parts of 1-amino-4-(4'-methylphenylamino)-anthraquinone and 17.5 parts of methyl acrylate is used instead of 20 parts of ethyl acrylate. A very good yield of a compound of the formula:

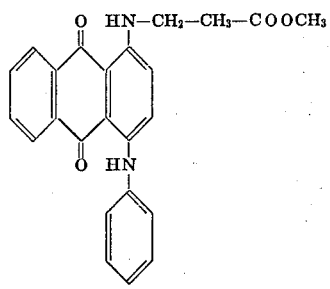

is obtained. The anthraquinone derivative is sulfonated analogously to the description in Example 15 and after having been worked up gives a dye mixture which consists of about 40 parts of the dye of the formula:

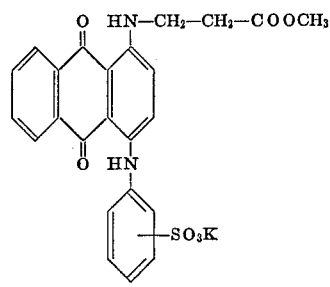

and about 60 parts of the dye of the formula:

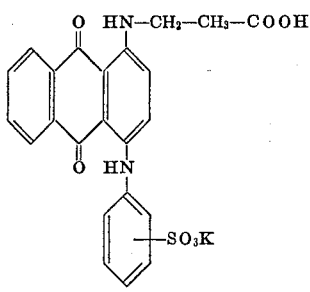

The mixture dyes polyamide blue shades of very good light and wet fastness properties.

EXAMPLE 17

20 parts of 1-($\beta$-carboxyethylamino)-4-bromoanthraquinone (prepared by reaction of 1-aminoanthraquinone with acrylic acid followed by bromination of the reaction product in 28% hydrochloric acid) are heated under reflux in a mixture of 80 parts of p-toluidine, 60 parts of water, 20 parts of crystallized ammonium acetate and 0.4 part of copper acetate until reaction is completed. The reaction mixture is then diluted with 160 parts of ethanol and filtered at room temperature and the filter residue is washed with ethanol until it is free from toluidine and then with water until it is free from salt. The product is then dried. A compound of the formula

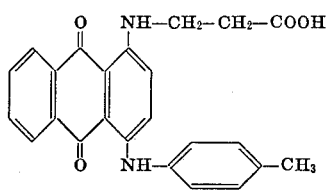

is obtained in a good yield. Sulfonation of this compound in the manner described in Example 2 gives the dye of Example 2, which dyes polyamide clear blue shades of very good fastness to light and perspiration.

EXAMPLE 18

16.4 parts of the compounds of the formula

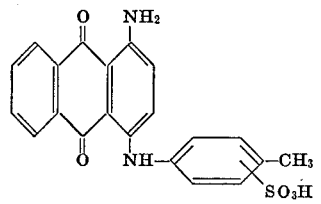

prepared by sulfonation of 1-amino-4-p-toluidinoanthraquinone, is heated to boiling in 80 parts of 75% aqueous acrylic acid until reaction is completed, which is the case after four hours, and the reaction mixture is allowed to cool, 300 parts of water is added and the precipitate is filtered off, washed with water until it is free from acrylic acid, and dried. A dye which is very similar to that of Example 2 and dyes polyamide clear blue shades having good fastness properties is obtained in a good yield.

EXAMPLE 19

8 parts of the compound obtained in accordance with Example 1 is stirred with 40 parts of 2-ethylhexyl alcohol in the presence of 1 part of 96% sulfuric acid at 120° C. until starting material can no longer be detected. This is the case after three to four hours. The reaction product is then poured into water and the mixture is made weakly alkaline with sodium carbonate. Excess 2-ethylhexanol is distilled off with steam, the residue is filtered, and the filter cake is washed with water and dried. There is obtained the compound of the formula

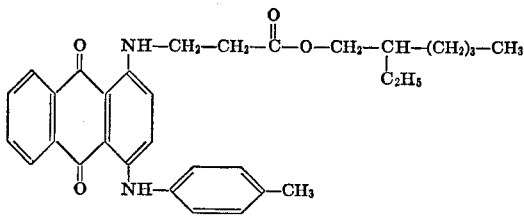

sulfonation of which gives a dye which dyes polyamide blue shades having good fastness properties.

EXAMPLE 20

The procedure of Example 19 is followed except that 40 parts of cyclohexanol is used instead of 40 parts of 2-ethylhexanol. A blue compound of the formula

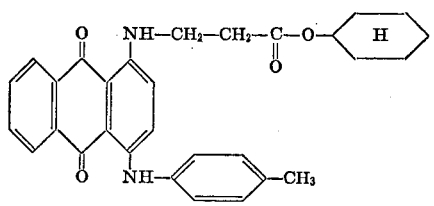

is obtained, which upon sulfonation gives a dye which dyes polyamide blue shades having good fastness properties.

EXAMPLE 21

8 parts of the dye obtained in accordance with Example 2 are stirred with 50 parts of 2-ethylhexanol in the presence of 1 part of 96% sulfuric acid at 120° C. until starting material can no longer be detected. The reaction mixture is poured into water, the mixture is made weakly alkaline and excess 2-ethylhexanol is distilled of with steam. After salting out with sodium chloride and filtration a dye is obtained which is similar to that obtained in Example 9 and dyes polyamide blue shades having good fastness properties.

I claim:

1. A blue anthraquinoid acid dye obtained by sulforating a compound of the formula in which

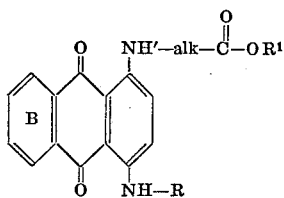

alk is a linear or branched alkylene of one to three carbon atoms, $R^1$ is hydrogen or alkyl or cycloalkyl of one to fifteen carbon atoms which may bear alkoxy or alkylthio of one to eight carbon atoms, chlorine or bromine as a substituent, R is selected from the group consisting of phenyl, naphthyl and

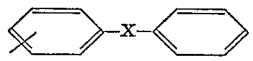

wherein X is a direct linkage,

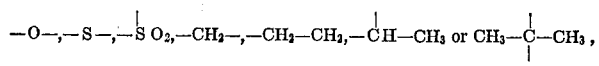

wherein one to four of the aromatic hydrogens in R may be replaced by identical or different alkyl, alkoxy or alkylthio of one to four carbon atoms and halogen and in which one or two of the hydrogens in ring B may be replaced by halogen or hydroxy.

2. Acid dyes of the formula given in claim 1 in which alk is a linear or branched alkylene of one to three carbon atoms, $R^1$ is hydrogen, alkyl of one to four carbon atoms in which are hydrogen may be replaced by methoxy or ethoxy, or cyclohexyl, R is phenylene in which one to three hydrogens may be replaced by identical or different alkyl, alkoxy, alkythio of one to four carbon atoms, chlorine, bromine and fluorine, or a diphenyl ether radical bearing chlorine or bromine as substituent.

3. Acid dyes of the formula given in claim 1 in which alk is the radical —$CH_2$—$CH_2$—,
$R^1$ is hydrogen, alkyl of one to four carbon atoms in which one hydrogen may be replaced by methoxy or ethoxy, or cyclohexyl and
R is phenylene which may be substituted with methyl, methoxy, methylthio, chlorine, fluorine or bromine or a diphenyl ether radical substituted with chlorine or bromine.

4. Dyes of the formula given in claim 1 in which alk is the radical —$CH_2$—$CH_2$—, $R^1$ is hydrogen, methyl, ethyl, propyl, isopropyl, n-butyl, iso-butyl, 3-methoxypropyl, 3-ethoxypropyl, 2-methoxyethyl, 2-ethoxyethyl or cyclohexyl and R is a divalent radical derived from benzene, toluene, xylene, trimethylbenzene, chlorobenzene, anisol, phenetol, diphenyl ether, 4-chlorodiphenyl ether, diphenyl, diphenyl thioether, diphenylethane or diphenylmethane.

5. Dyes of the formula given in claim 1 in which alk is the radical —$CH_2$—$CH_2$—, $R^1$ is hydrogen and R is a divalent radical derived from benzene, toluene, trimethylbenzene, diphenyl ether or 4-chlorodiphenyl ether.

6. Dyes of the formula given in claim 1 wherein alk is the radical —$CH_2$—$CH_2$—, $R^1$ is methyl, ethyl, propyl, butyl, 2-ethylhexyl or cyclohexyl and R is a radical derived from benzene, toluene, anisol, trimethylbenzene, diphenyl ether or 4-chlorodiphenyl ether.

References Cited
UNITED STATES PATENTS
3,580,933   5/1971   Guenthard _____ 260—372

LORRAINE A. WEINBERGER, Primary Examiner

E. J. SKELLY, Assistant Examiner

U.S. Cl. X.R.
8—39; 260—376

UNITED STATES PATENT AND TRADEMARK OFFICE
CERTIFICATE OF CORRECTION

PATENT NO. : 3,845,080
DATED : October 29, 1974
INVENTOR(S) : Fritz Graser

It is certified that error appears in the above-identified patent and that said Letters Patent are hereby corrected as shown below:

In Column 1, Line 71, delete "fastnes" and substitute --fastness--

In Column 4, Line 17, delete "$H_2N-R-H$" and substitute --$H_2N-R-H$ (VII)--

In Column 5, Line 31, delete " A good yield ..." and substitute -- A very good yield ... --

In Column 9, the first formula in Example 16, delete

" 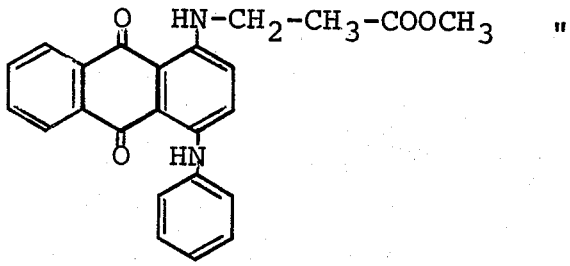 "

and substitute

-- 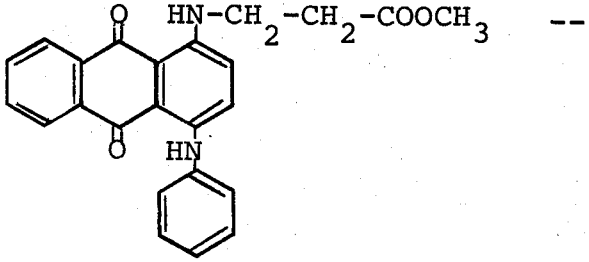 --

UNITED STATES PATENT AND TRADEMARK OFFICE
CERTIFICATE OF CORRECTION

PATENT NO. : 3,845,080
DATED : October 29, 1974
INVENTOR(S) : Fritz Graser

It is certified that error appears in the above-identified patent and that said Letters Patent are hereby corrected as shown below:

In Column 1, Line 71, delete "fastnes" and substitute --fastness--

In Column 4, Line 17, delete "$H_2N-R-H$" and substitute --$H_2N-R-H$ (VII)--

In Column 5, Line 31, delete " A good yield ..." and substitute -- A very good yield ... --

In Column 9, the first formula in Example 16, delete

"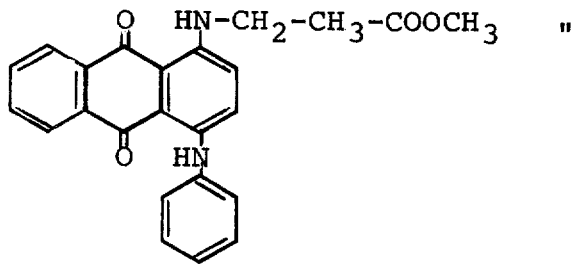"

and substitute

--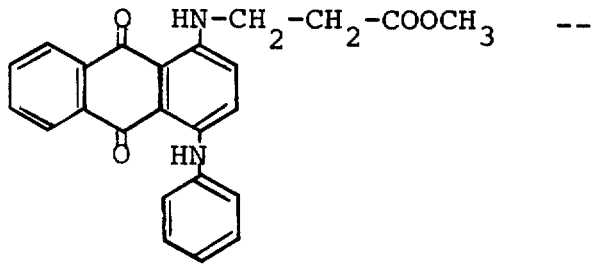--

UNITED STATES PATENT AND TRADEMARK OFFICE
CERTIFICATE OF CORRECTION

PATENT NO. : 3,845,080
DATED : October 29, 1974
INVENTOR(S) : Fritz Graser

It is certified that error appears in the above-identified patent and that said Letters Patent are hereby corrected as shown below:

In Column 10, the first formula, delete

" 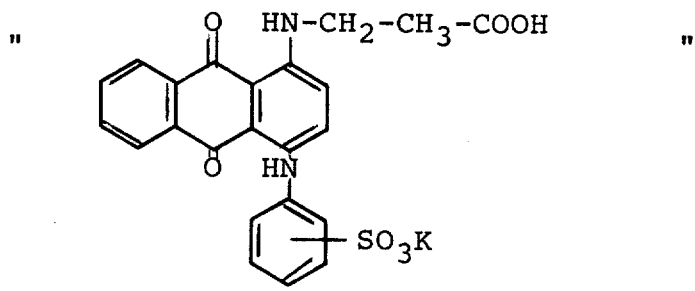 "

and substitute

-- 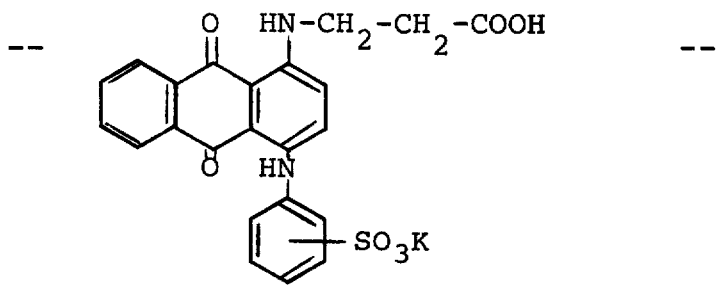 --

In Column 11, Claim 1, Line 1, delete " sulforating" and substitute -- sulfonating --

In Column 12, Claim 2, Line 4, delete " ... in which are hydrogen ... " and substitute -- ... in which one hydrogen...--

Signed and Sealed this

Twentieth Day of July 1976

[SEAL]

Attest:

RUTH C. MASON
Attesting Officer

C. MARSHALL DANN
Commissioner of Patents and Trademarks